United States Patent [19]

Rasmussen

[11] 4,393,674
[45] Jul. 19, 1983

[54] HYDRAULIC CHUCK DEVICE FOR ENGAGEMENT WITH THE INSIDE OF A TUBE

[75] Inventor: Robert Rasmussen, Minneapolis, Minn.

[73] Assignee: Air-Mo Hydraulics, Inc., Minneapolis, Minn.

[21] Appl. No.: 277,206

[22] Filed: Jun. 25, 1981

[51] Int. Cl.³ .............................................. B21D 22/10
[52] U.S. Cl. ................................ 72/61; 29/157.3 C; 29/252; 29/421 R; 73/49.1; 73/49.5; 73/49.8; 279/2 A
[58] Field of Search .................. 72/61, 370; 279/2 A; 29/705, 252, 237, 407, 421 R, 157.3 C; 73/49.1, 49.5, 49.8

[56] References Cited

U.S. PATENT DOCUMENTS

| | | | |
|---|---|---|---|
| 2,949,313 | 8/1960 | Moser et al. | 279/2 A |
| 3,505,846 | 4/1970 | Smida | 72/61 |
| 3,613,423 | 10/1971 | Nakamura | 72/61 |
| 3,726,319 | 4/1973 | Patterson | 73/49.8 |
| 3,813,751 | 6/1974 | Smida | 29/727 |
| 3,962,769 | 6/1976 | Smida | 29/727 |
| 4,118,972 | 10/1978 | Goeppner et al. | 73/49.2 |
| 4,194,388 | 3/1980 | Mack | 73/49.8 |

Primary Examiner—Leon Gilden
Attorney, Agent, or Firm—John S. Munday

[57] ABSTRACT

A hydraulic chuck device for use with the inside of a tube. Included is a body defining a chamber and a piston slideably mounted in said chamber. An axially centered stem means is mounted at one of its end on said piston and has a passage along its axis, while sleeve means slideably cover said stem means and are mounted on said body. Collet means are operably connected to said stem means and said sleeve means such that relative movement of one with respect to the other causes activation of said collets. First fluid means are connected to said piston to cause relative movement between said stem and said sleeve, and second fluid means are connected to said stem means for passage of fluid through said passage of said stem means into the inside of said tube. In a preferred embodiment said first means is a pneumatic means positioned to move said piston in said chamber, from a first position blocking passage of fluid from said second fluid means to a second position permitting passage of fluid into said passage, whereby said collets are activated in said second position. The second fluid means preferably has associated herewith an auxiliary chamber communicating with said piston in said second position to permit fluid pressure to further urge said piston to said second position. In a preferred embodiment, collet engaging means are mounted on stem and collet surface activating means are on said sleeve to cooperatively activate the collets. Seal means are preferably supplied to engage the inside of said tube when said collets are engaged.

9 Claims, 1 Drawing Figure

HYDRAULIC CHUCK DEVICE FOR ENGAGEMENT WITH THE INSIDE OF A TUBE

BACKGROUND OF THE INVENTION

Fluid pressure operated devices for radially expanding portions of tubing are known, such devices being disclosed in U.S. Pat. Nos. 1,448,457; 2,479,702; 2,938,562; and 3,200,627. Structures of these patents include fluid conveying mandrels to hold the tubing, and die elements against which portions of the tubing are flared or otherwise formed by fluid pressure. These expanding devices are customarily used to provide short bulges in tubing for coupling purposes and the like. In addition, they are used to expand tubing to fit fins and other apparatus connected to the outer surface of the tubing.

Several hydraulic chucks have been developed which are suitable for tightly gripping one end of the elongated tube while simultaneously delivering a tube expanding fluid. Among these are U.S. Pat. Nos. 3,505,846; 3,813,751; 3,962,769; and 4,189,162.

One of the problems which continuously plague those users of hydraulic chucks is the inability to employ them after the exterior of the tube has been modified. All of the above described hydraulic chucks engage the outside of the tube as well as the inside, and for that reason cannot be used in systems where fins, plates and other components extend up to the edge of the tube. Many tube and shell arrangements for heat transfer, such as in nuclear energy facilities, are employed where the header plate is located at the end of the tube. Even though prior art hydraulic chucks cannot engage the tube, these shell and tube configerations need to be tested for fluidic soundness and safety.

Not only is it necessary to engage the interior of said tube, it is necessary to deliver fluid to the interior of said tube at sufficient pressure to test the tube at or above the pressure at which it is intended to operate. Accordingly any device which engages the interior of the tube should preferably prevent passage of fluid in unwanted areas, such as inadvertently out the end of the tube.

Yet another feature which would be of advantage in a hydraulic chuck adapted to engage the interior of a tube is the ability to grip the fluid independently of the amount, if any, of fluid pressure in the tube. This feature would permit preloading of the tube with the fluid to avoid surges and other disruptive effects. Nevertheless it would be additionally helpful if the grip on the tube, and the seal between the tube and the hydraulic chuck, could be increased in strength as the fluid pressure in the tube is increased.

SUMMARY OF THE INVENTION

The present invention relates to a hydraulic chuck comprising a plurality of parts in interworking relationship which accomplish the above described objects. Specifically, a hydraulic chuck device is provided for use with the inside of a tube. The chuck device includes a body defining a chamber and a piston slideably mounted in said chamber such that fluid pressure on one side or the other of the piston will cause the piston to move, according to normal fluidics. An axially centered stem means is mounted at one of its ends on said piston and has a passage along its axis. Sleeve means are mounted on said body and slideably cover the stem means. Collet means are operably connected to said stem means and said sleeve means such that relative movement of one with respect to the other causes activation of the collets. First fluid means are connected to said piston to cause relative movement between said stem means and said sleeve. Finally second fluid means are connected to said stem means for passage of fluid through said passage of said stem means into the inside of said tube.

In a preferred embodiment, the chuck device of this invention is adapted to permit the second fluid means to communicate with the passage in said stem means only when the relative position of said stem means and said sleeve means cause activation of said collets. Also preferred is to have said first fluid means comprise pneumatic means for moving said piston in said chamber. In one particular embodiment, the first fluid means is operable to move the piston between a first position blocking passage of fluid from said second fluid means to said passage in said stem means and a second position permitting passage of fluid from said second fluid means to said passage. The collet means are activated when said piston is moved to said second position.

Also, preferred are those embodiments where the second fluid means includes auxiliary chamber means communicating with said piston in said second position to permit fluid pressure from said second fluid means to further urge said piston means toward said second position. Thus when fluid flows through said passage, the fluid forces the piston further in one direction as the pressure increases.

In a particularly preferred embodiment, collet engaging means are mounted on the other end of the stem means from the piston means and are adapted to move with the stem means. Collet surface activating means are mounted on the sleeve and are positioned in operable relationship with the collets such that movement of the collet engaging means toward the collets forces the collets against the collet surface activating means to activate the collets.

In most embodiments, it is preferred that the device includes seal means adjacent the collet means, said seal means being positioned to expand during engagement of said collets and sized to fit the inside of the tube. Thus when the auxiliary chamber increases the force of the collets, that same force can be used to increase the pressure of the sea.

DESCRIPTION OF THE DRAWINGS

For a more complete understanding of the invention, reference is hereby made to the drawings in which:

The view is a sectional view and side elevation of a chuck device of the present invention, with the section taken along the center axis of the chuck.

DETAILED DESCRIPTION OF THE INVENTION

Figure 1:
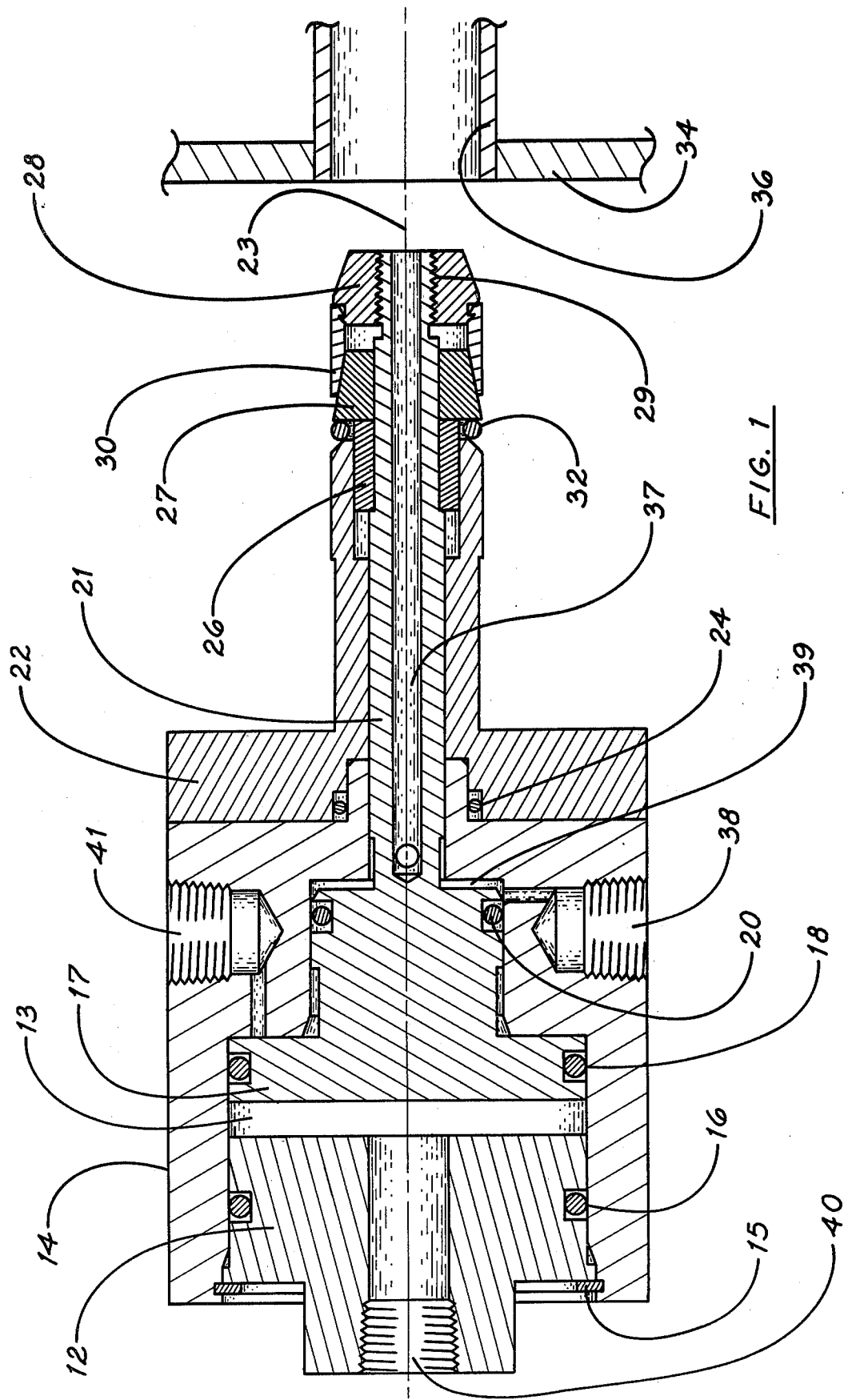

As shown in the figure, a tube 36 may be fastened to a boiler plate 34 or other device, as in common in the shell and tube design. The device of this invention, shown generally by reference numeral 10, is adapted to fit inside tube 36 so that fluid can be transferred through the device to the inside of the tube, for testing and/or expanding the tube arrangement. As will be apparant from a reading of this description, the hydraulic chuck device 10 is capable of gripping the tube 36 before fluid is passed into the tube 36. Fluid can then be transferred via the chuck 10 and hydraulic pressure used to accomplish the intended use.

The device 10 has a cylinder cap 12 which fits inside the body 14 to define a chamber 13. Snap ring 15 and seal 16 insure the security of the chamber. Piston 17, fitted with seals 18 and 20, is positioned inside the chamber 13 in slideable relationship with the body 14 of the chuck.

Stem 21 is mounted at one end of piston 17 and is axially centered about axis 23. Sleeve means 22 slideably covers the stem 21 and is mounted on the body 14, and sealed by seal 24. Bushing 26 is mounted on the other end of stem 21 and abuts cone 27 and is threaded onto nut 28 via threads 29. Collets 30, which in this device is a ring collet, is fitted between cone 27 and nut 28 under just sufficient pressure, via threads 29, to have collets 30 fit within tube 36 when piston 17 is substantially to the right of chamber 13, as shown. O ring 32 is fitted between the cone 27 and the end of sleeve 22, resting on bushing 26, so that seal 32 also fits within tube 36.

Stem 21 includes a central passage 37 centered about axis 23 so that fluid can pass through passage 37 into tube 36. Fluid inlet 38 acts to supply hydraulic fluid to passage 37 so that auxiliary chamber 39 expands to receive fluid, thereby permitting the fluid to force piston 17 to the left of chamber 13, as shown in the figure. Air inlets 40 and 41 permit regulation of the position of piston 17 in chamber 13, from a first position as shown, where collets 30 and seal 32 are relaxed and sized to fit the tube 36, to a second position to the left in chamber 13, near cylinder cap 12 by expelling air through inlet 40 and forcing air in inlet 41. As piston 17 moves to the left in chamber 13, nut 28, which is attached to stem 21 via threads 29 movves to the left as well. Cone 27, resting on bushing 26 and stem 21 moves with nut 28 until bushing 26 engagei the sleeve 22. Sleeve 22 is fixedly mounted on body 14, while stem 21 is mounted on piston 17, which moves with respect to body 14. Then bushing 26 engages sleeve 22, the cone 27 and nut 28 to cause collets 30 to expand and grip the inside of tube 36. Cone 27 further is urged against seal 32, which effectively prevents fluid from passing along sleeve 22 from inside tube 36.

As the fluid passes through passage 37, auxiliary chamber 39 is expanded in size and filled with fluid. Once the fluid meets resistance in the tube 36, the fluid forces piston 17 away from tube 36, causing more pressure on seal 32 and collets 30, further gripping the tube 36.

In operation the device of this invention exhibits several superior advantages. The sleeve 22 and nut and cone assembly 28 and 27 is inserted into tube 36 when piston 17 is to the right in chamber 13. Air is let in inlet 41 and out outlet 40 to force piston 17 to the left, bringing bushing 26 against sleeve 22 to expand collet 30 to grip tube 36. Passage 37 is then in position to communicate with fluid supply 38 so that fluid can easily be let into tube 36 bia passage 37. Auxiliary chamber 39 is filled with fluid, and, as the hydraulic pressure is increased, to test tube 36, or expand a portion or whatever, piston 17 is driven further toward cylinder cap 12 to further tighten collets 30 and seal 32. Thus the more pressure that is applied, the more solidly the grip and seal become.

Having thus described the invention, what is claimed is:

1. A hydraulic chuck device for use with the inside of a tube, comprising:
    a body defining a chamber; a piston slideably mounted in said chamber; an axially centered stem means mounted at one end on said piston and having a passage along its axis; sleeve means slideably covering said stem means and mounted on said body; collet means operably connected to said stem means and said sleeve means such that relative movement of one with respect to the other causes activation of said collets;
    first fluid means connected to said piston to cause relative movement between said stem means and said sleeve; and
    second fluid means connected to said stem means for passage of fluid through said passage of said stem means into the inside of said tube.

2. The device of claim 1, wherein said second fluid means is positioned to communicate with said passage only when the relative position of said stem means and said sleeve means causes activation of said collets.

3. The device of claim 1, wherein said first fluid means includes pneumatic means positioned to move said piston in said chamber.

4. The device of claim 1, wherein said first fluid means is operable to move said piston between a first position blocking passage of fluid from said second fluid means to said passage in said stem and a second position permitting passage of fluid from said second fluid means to said passage.

5. The device in claim 4, wherein said collet means are activated when said piston is moved to said second position.

6. The device of claim 5, wherein said second fluid means includes auxiliary chamber means communicating with said piston in said second position to permit fluid pressure from said second fluid means to further urge said piston means toward said second position.

7. The device of claim 1, which further includes collet engaging means mounted on the other end of said stem means adapted to move with said stem means, and collet surface activating means mounted on said sleeve and positioned in operable relationship with said collets, such that movement of said collet engaging means toward said collet surface activating means to activate said collets.

8. The device in claim 7, which further includes seal means adjacent said collet means, said seal means being positioned to expand during engagement of said collets; said seal means being sized to fit said tube.

9. The device of claim 7, which further includes auxiliary chamber means in said second fluid means and in communication with said stem means to permit fluid pressure from said second fluid means to further urge said collet engaging means toward said collets, whereby increased fluid pressure causes increased engagement of said collets.

* * * * *